(12) United States Patent
Pirch

(10) Patent No.: US 11,133,845 B2
(45) Date of Patent: Sep. 28, 2021

(54) DETUNING DETECTION AND COMPENSATION FOR INDUCTIVE COUPLING SYSTEMS

(71) Applicant: ASSA ABLOY AB, Stockholm (SE)

(72) Inventor: Hans-Juergen Pirch, Feldkirchen (AT)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/704,252

(22) Filed: Dec. 5, 2019

(65) Prior Publication Data
US 2021/0175933 A1 Jun. 10, 2021

(51) Int. Cl.
*H04B 5/00* (2006.01)
*G06K 19/07* (2006.01)

(52) U.S. Cl.
CPC ....... *H04B 5/0062* (2013.01); *G06K 19/0723* (2013.01)

(58) Field of Classification Search
CPC .......................... H04B 5/0062; G06K 19/0723
See application file for complete search history.

(56) References Cited

U.S. PATENT DOCUMENTS

| 4,043,800 | A  | * | 8/1977  | Mahn    | C21C 5/30    |
|           |    |   |         |         | 75/375       |
| 6,650,227 | B1 | * | 11/2003 | Bradin  | G06K 7/0008  |
|           |    |   |         |         | 340/10.1     |
| 6,703,920 | B2 | * | 3/2004  | Zimmer  | G06K 7/0008  |
|           |    |   |         |         | 340/10.34    |
| 7,916,000 | B2 | * | 3/2011  | Tucker  | H03H 7/40    |
|           |    |   |         |         | 340/10.1     |
| 8,482,157 | B2 | * | 7/2013  | Cook    | H02J 50/27   |
|           |    |   |         |         | 307/104      |
| 9,853,363 | B2 | * | 12/2017 | Ali     | H04B 17/13   |
| 10,164,600| B2 | * | 12/2018 | Kormann | G06K 7/10158 |
| 2005/0237198 | A1 | * | 10/2005 | Waldner | G06K 19/0712 |
|           |    |   |         |         | 340/572.7    |
| 2007/0057797 | A1 | * | 3/2007 | Waldner | G06K 19/07796 |
|           |    |   |         |         | 340/572.7    |
| 2007/0091006 | A1 | * | 4/2007 | Thober  | H01Q 7/005   |
|           |    |   |         |         | 343/745      |

(Continued)

FOREIGN PATENT DOCUMENTS

| EP | 2632056 A1       | 8/2013  |
| WO | WO-2005104022 A1 | 11/2005 |

OTHER PUBLICATIONS

"International Application Serial No. PCT/EP2020/083353, International Search Report dated Feb. 9, 2021", 4 pgs.

(Continued)

*Primary Examiner* — Lewis G West
(74) *Attorney, Agent, or Firm* — Schwegman Lundberg & Woessner, P.A.

(57) ABSTRACT

This disclosure describes techniques for operating an inductive coupling reader. The techniques include operations comprising: detecting a change in a resonance frequency of the inductive coupling reader; comparing the change in the resonance frequency to a threshold; determining that the change in the resonance frequency falls outside the threshold; and activating a compensation circuit to offset the change in the resonance frequency of the inductive coupling reader in response to determining that the change in the resonance frequency falls outside the threshold.

20 Claims, 5 Drawing Sheets

(56) References Cited

U.S. PATENT DOCUMENTS

| | | | |
|---|---|---|---|
| 2007/0142088 A1* | 6/2007 | Boh | B60R 25/00 |
| | | | 455/562.1 |
| 2009/0002175 A1* | 1/2009 | Waters | G06K 19/0723 |
| | | | 340/572.5 |
| 2010/0030167 A1* | 2/2010 | Thirstrup | A61F 5/443 |
| | | | 604/318 |
| 2011/0040498 A1* | 2/2011 | Huang | G01B 7/16 |
| | | | 702/34 |
| 2011/0205133 A1 | 8/2011 | Fukasawa | |
| 2011/0269496 A1* | 11/2011 | Shinohara | H04W 52/283 |
| | | | 455/522 |
| 2013/0217327 A1 | 8/2013 | Kanno et al. | |
| 2015/0180240 A1* | 6/2015 | Kwon | H02J 50/12 |
| | | | 307/104 |
| 2018/0176712 A1* | 6/2018 | Hueber | H04B 5/0031 |
| 2019/0187735 A1* | 6/2019 | Ramos | G05F 1/575 |
| 2019/0305829 A1* | 10/2019 | Hueber | H04W 52/18 |
| 2020/0177421 A1* | 6/2020 | Czempas | H04B 17/20 |

OTHER PUBLICATIONS

"International Application Serial No. PCT/EP2020/083353, Written Opinion dated Feb. 9, 2021", 4 pgs.

\* cited by examiner

DETUNING DETECTION AND COMPENSATION FOR INDUCTIVE COUPLING SYSTEMS

FIELD OF THE DISCLOSURE

This document pertains generally, but not by way of limitation, to Radio Frequency Identification (RFID) systems and, more particularly, to techniques for reducing harmful interference effects in RFID systems.

BACKGROUND

An RFID system is a system that uses radio frequency transponders (e.g., tags) to identify items-of-interest. Each radio frequency transponder is attached to or near a corresponding item and includes information identifying that item. When an identification needs to be made, a radio frequency reader unit (e.g., an interrogator) is used to excite (e.g., interrogate) the transponder on the item that then transmits an identification signal (including the identification information for the item) back to the reader unit. The reader unit then uses the identification information received from the transponder to perform any of a number of different RFID applications. For example, the identification information can be used to perform functions such as asset management, inventory tracking, access control, and others.

SUMMARY OF THE DISCLOSURE

In some certain embodiments, a system and method are provided for operating an inductive coupling reader. The disclosed system and method perform operations comprising: detecting a change in a resonance frequency of the inductive coupling reader; comparing the change in the resonance frequency to a threshold; determining that the change in the resonance frequency exceeds the threshold; and activating a compensation circuit to offset the change in the resonance frequency of the inductive coupling reader in response to determining that the change in the resonance frequency exceeds the threshold.

In some embodiments, the change in the resonance frequency is caused by an external metal material in close proximity to the inductive coupling reader, and a range of the inductive coupling reader is reduced as a result of the change in the resonance frequency.

In some embodiments, detecting the change in the resonance frequency comprises measuring an amount of current being driven to the inductive coupling reader using a current sensor.

In some embodiments, the amount of current being driven to the inductive coupling reader is compared to the expected amount of current. In such cases, the change in the resonance frequency is determined to exceed the threshold when the amount of current is less than the expected amount of current by a given amount.

In some embodiments, the amount of current being driven to the inductive coupling reader comprises the current being driven to an antenna of the inductive coupling reader, and the given amount comprises ten percent of the expected amount of current.

In some embodiments, the expected amount of current is retrieved from a look-up table.

In some embodiments, the compensation circuit comprises one or more capacitors coupled in parallel to a resonance circuit of the inductive coupling reader.

In some embodiments, proper operation of the inductive coupling reader is verified after activating the compensation circuit by comparing a current amount of current being driven to the inductive coupling reader to an expected amount of current.

In some embodiments, the threshold comprises a first threshold, and the compensation circuit comprises a first compensation circuit. In such cases, the operations further comprise: determining that the change in the resonance frequency exceeds the first threshold and is less than a second threshold; activating the first compensation circuit in response to determining that the change in the resonance frequency exceeds the first threshold and is less than the second threshold; determining that the change in the resonance frequency exceeds the first threshold and the second threshold; and activating a second compensation circuit in response to determining that the change in the resonance frequency exceeds the first threshold and the second threshold, wherein the second compensation circuit provides a greater offset to the resonance frequency than the first compensation circuit.

In some embodiments, activation of the first compensation circuit couples a first capacitor in parallel with a resonance circuit of the inductive coupling reader, and activation of the second compensation circuit couples a second capacitor in parallel with the resonance circuit of the inductive coupling reader, the second capacitor being greater than the first capacitor.

In some embodiments, the second capacitor includes the first capacitor and at least one more capacitor.

In some embodiments, the operations further comprise computing the offset provided by the compensation circuit by: mounting the inductive coupling reader on a metal surface; measuring a detuning effect of the metal surface on the inductive coupling reader; and computing the offset to compensate for the measured detuning effect.

In some embodiments, the compensation circuit comprises: a switch and one or more capacitors having a first terminal coupled to first terminals of capacitors of a resonance circuit of the inductive coupling reader and having a second terminal coupled to the switch.

In some embodiments, the one or more capacitors are coupled to the switch via a diode.

In some embodiments, the compensation circuitry is activated by closing the switch to couple the second terminal of the one or more capacitors to ground.

In some embodiments, the switch comprises a transistor.

In some embodiments, the inductive coupling reader comprises an RFID reader.

Metal material in close proximity to conventional RFID readers typically reduces the range of the conventional RFID readers because the metal material changes the resonance frequency of the resonance circuit of the RFID readers. The disclosed embodiments detect interference and detuning of the resonance circuit of the inductive coupling reader and, in response, switch in additional parallel capacitance to compensate for such detuning. In this way, the overall power efficiency and range of inductive coupling readers, such as RFID readers, is improved which improves the overall efficiency and functioning of the computer.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This disclosure describes, among other things, techniques for operating an inductive coupling reader. Specifically, the disclosed techniques detect interference and detuning of the resonance circuit of the inductive coupling reader and, in response, switch in additional parallel capacitance to compensate for such detuning. In this way, the overall power efficiency and range of inductive coupling readers, such as RFID readers, is improved which improves the overall efficiency and functioning of the computer.

In an RFID system, a problem arises when one or more external interference signals are present within the frequency band of the system during an interrogation operation. Such interference will often cause misidentification of items-of-interest and faulty reporting in the RFID system. Increasingly, such interference is being caused by metal material located near the system-of-interest. Such metal material significantly reduces the range of the RFID interrogator, particularly because such metal material changes the resonance frequency of the resonance circuit of the RFID interrogator. For example, if an inductive coupling reader (e.g., a 13.56 MHz RFID reader) is mounted on a metal surface, the apparent inductance of its antenna will change. As the antenna is part of a parallel resonance circuit that is used to communicate with an RFID transponder (e.g., a credential, such as an RFID tag), the actual performance (e.g., read range) will degrade due to the detuning of this circuit. This will also cause the RFID reader to consume more power to read a given RFID tag that wastes system resources.

To address the shortcomings of such typical scenarios, the disclosed techniques detect circumstances in which the resonance circuit of the inductive coupling reader is detuned and compensated for such detuning. Particularly, the disclosed techniques employ a current sensor to measure the actual power consumption of the inductive coupling reader. If the power consumption fails to meet some predefined threshold (e.g., exceeds a threshold value, falls below a threshold value, or falls outside of a threshold range), the system determines that the resonance circuit has been detuned (e.g., because of presence of a metal material in proximity to the inductive coupling reader). In such cases, the inductive coupling reader employs a switchable tuning capacitor that allows the inductive coupling reader to add additional parallel capacitance to mitigate and compensate for the detuning. This enables performance of the inductive coupling reader to be recovered and improved which enhances the power efficiency and range of the inductive coupling reader. As such, the overall efficiency and functioning of the computer is improved.

Figure 1:
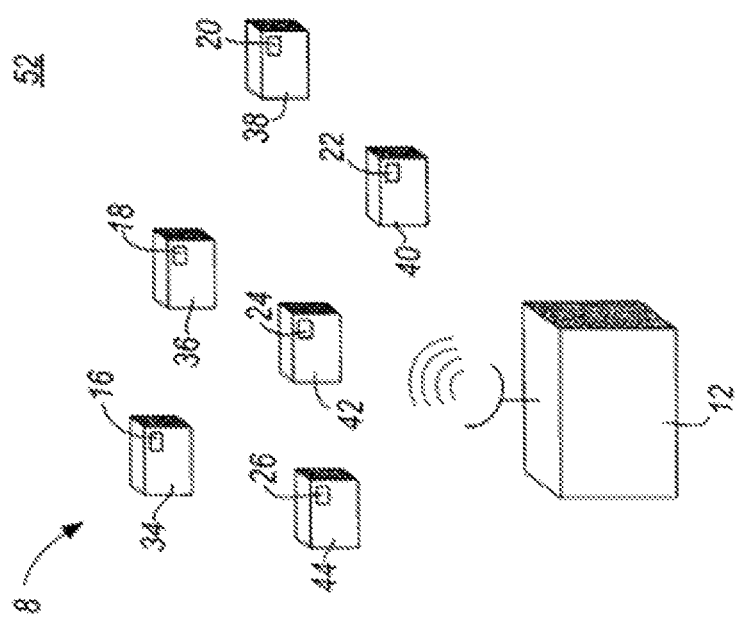
FIG. 1 is a block diagram illustrating an RFID system in accordance with various embodiments.

FIG. 1 is a block diagram illustrating an RFID system according to some embodiments. As illustrated, an RFID system 8 includes: an RF reader unit 12 (inductive coupling reader) and a first plurality of RF identification tags 16, 18, 20, 22, 24, 26 that are each attached to a corresponding item-of-interest 34, 36, 38, 40, 42, and 44 for use in identifying the item-of-interest. The items-of-interest 34, 36, 38, 40, 42, and 44 can include, for example, pieces of inventory, personnel, capital assets, or any other objects for which it may be desirable to track or monitor within a particular region. The number of items that a particular reader is capable of tracking is generally a matter of design choice.

The RF reader unit 12 can be a stationary unit, such as wall mounted proximity readers, or a portable unit that can be easily relocated. In general, the coverage region serviced by an RF reader unit will be a function of the transmit power level of the reader, the antenna pattern of the reader transmit antenna, and the location and orientation of the reader at any particular time.

During normal operation of the example system of FIG. 1, the RF reader unit 12 periodically interrogates its coverage region 52 to identify the items-of-interest that are presently located therein. That is, the reader unit 12 periodically transmits an RF interrogation signal within the coverage region 52 that acts as a "request" for each of the RF tags 16-26 within the region 52 to transmit its identification signal identifying the associated item-of-interest. Each of the RF tags within the coverage region 52 receives the interrogation signal and responds by transmitting its identification signal back to the interrogating reader. To prevent signal collisions in the channel between the RF tags and the reader within a particular coverage region, the RF tags can each transmit their identification signals after a different quasi-random delay period. When the RF reader receives an identification signal from one of the RF tags, it transmits an acknowledgment signal to that RF tag informing it that its identity has been recorded. After receiving the acknowledgment signal, the identified RF tag does not retransmit its identification signal. If, after transmitting its identification signal and waiting for a predetermined time period, an RF tag does not receive an acknowledgment signal, it can assume that a collision has occurred in the channel and it can retransmit its identification signal after another quasi-random delay period. This can continue until an acknowledgment signal is received from the reader by each of the RF tags in the coverage region. After receiving identification information from all of the RF tags within its coverage region 52, the RF reader unit reports the collected information to an appropriate entity.

With reference to FIG. 1, it can be appreciated that some interference between the RF reader unit 12 and metal material is likely to occur. For example, the RF reader unit 12 may be wall mounted on a wall that includes metal material. Such metal material can influence the resonance circuit of the RF reader unit 12 and change the resonance frequency of the resonance circuit. This can reduce the range of the RF reader unit 12 causing the RF reader unit 12 to misidentify or fail to identify items within the region 52 that are further away from the RF reader unit 12. Namely, the size of the region 52 may be reduced when metal material is present in proximity to the RF reader unit 12. Also, the amount of power needed by the RF reader unit 12 to properly operate may be increased because the resonance frequency of the RF reader unit 12 changes.

In accordance with the present disclosure, a method and apparatus is provided for reducing the negative effects of interference within an RFID system by compensating for metal material determined to cause changes to the resonance frequency of the RF reader unit 12.

Figure 2:
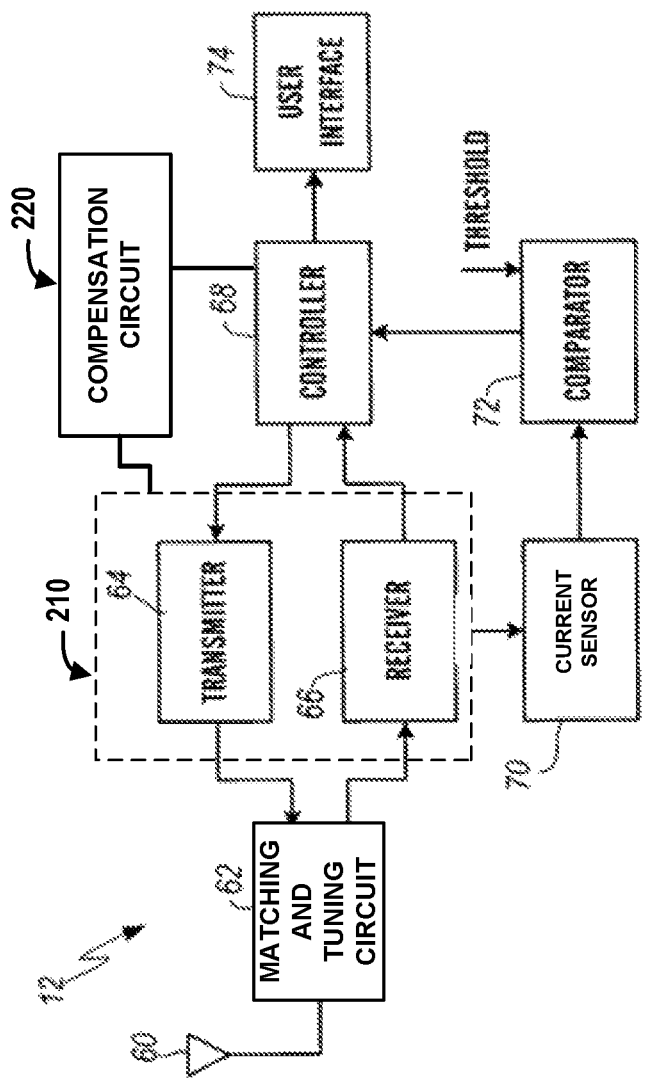
FIG. 2 is a block diagram illustrating a reader unit for use in an RFID system in accordance with various embodiments.

FIG. 2 is a block diagram illustrating an RF reader unit 12 in accordance with one embodiment of the present disclosure. As illustrated, the reader unit 12 includes: an antenna 60, a matching and tuning circuit 62, a resonance circuit 210 that includes a transmitter 64 and a receiver 66, a controller 68, a current sensor 70, a comparator 72, a compensation circuit 220 and a user interface 74. While comparator 72 is drawn in FIG. 2 as a separate physical component, some or all of the functionality of comparator 72 can be implemented by controller 68. Namely, rather than being implemented by a hardware element, the functionality of the comparator 72 can be implemented in software by controller 68. In such cases, the output of the current sensor 70 is provided directly to the controller 68.

The controller 68 is operative for controlling the operation of the reader unit 12 in order to interrogate, track, and report on items-of-interest within the coverage region 52 of the reader unit 12. The controller 68 is implemented using a digital processing device, such as a general-purpose microprocessor, a digital signal processor, a reduced instruction set computer, a complex instruction set computer, or a field programmable gate array. In addition, one or more of the other functional blocks illustrated in FIG. 2 can also be implemented digitally within the same (or a different) digital processor as the controller 68.

The transmitter 64 is used to generate interrogation signals (under the control of the controller 68) for transmission into the coverage region 52 via antenna 60 during an interrogation operation. The transmitter 64 can also be used to generate an acknowledgment signal for delivery to a specific RF tag after identification information has been received from the tag, as described above. The receiver 66 is operative for, among other things, receiving, demodulating, and decoding identification signals received from RF tags located within the coverage region 52 and for delivering the resulting identification information to the controller 68.

The matching and tuning circuit 62 is a device that improves the efficiency with which power available from a driver is delivered to the antenna 60. Impedances at the antenna 60 can be too high for low-voltage drivers to be able to develop enough power directly and, in such cases, a matching network is used to compensate for and match the impedances at the antenna 60. In addition to the impedance matching in the case of inductive coupling RFID systems, the matching and tuning circuit 62 can also be used to set the resonance frequency of the antenna 60 correctly.

As the controller 68 collects tag identification information from the corresponding coverage region 52, it reports the data to an appropriate entity via user interface 74. Alternatively, the controller 68 can wait until all of the tag information has been collected for the coverage region 52 before it reports the data. The user interface 74 can take many different forms depending upon the type of reporting being done within the system. For example, the interface 74 can be coupled to a video display for displaying the identification data to an operator. Alternatively, the interface 74 could include a modem for transferring the data to a remote computer for storage. In some embodiments, the reader unit in a large RFID system interfaces via interface 74 to a central control processor that assembles, manages, and analyzes the identification information to generate a system wide report. The central control processor can also use the information to perform other system functions such as activating electric door locks, sending messages to user displays (including a display on the reader itself), sounding alarms, and activating recording devices (e.g., a video camera). Other forms of user interface 74 can also be used.

In some embodiments, the controller 68 detects a change in a resonance frequency of the reader 12. Specifically, the controller 68 detects a change in the resonance frequency of the resonance circuit 210. In some implementations, the controller 68 detects the change in the resonance frequency based on an amount of current being driven to the reader 12, and specifically to the resonance circuit 210. In particular, a current sensor 70 is coupled to the resonance circuit 210 and measures the amount of current driven to the resonance circuit 210. The current sensor 70 provides the measured current value to the comparator 72. The comparator 72 accesses a preset threshold and determines whether the measured current value received from the current sensor 70 falls outside the threshold. In some cases, the comparator 72 determines whether the measured current falls below a threshold value. In some cases, the comparator 72 determines whether the measured current exceeds a threshold value. In some cases, the comparator 72 determines whether the measured current falls outside of a threshold range. Namely, the threshold could be a specific value, such as a value that is 10% higher or 10% lower than the normal current, or it could be a range, such as within 10% of the normal current.

The preset threshold of the comparator 72 represents an expected amount of current drawn by the resonance circuit 210 under normal operations. When the current falls outside of the preset threshold, the comparator 72 provides an indication to the controller 68. The indication may inform the controller 68 that a metal material is in close proximity to the reader 12. In response to determining that the current is above a preset value, below a preset value, or outside of a range of values, the controller 68 may detect that the resonance frequency of the inductive coupling reader has changed by an amount that falls outside a threshold. In such cases, the controller 68 activates the compensation circuit 220 to couple one or more capacitors in parallel with the resonance circuit 210 to offset the change in the resonance frequency.

As an example, the preset threshold may be set to a value that is 10% higher or 10% lower than the value of the current drawn by the resonance circuit 210 (e.g., an antenna of the resonance circuit 210) when no metal material is in close proximity to the reader 12. The preset threshold may be programmed into a look-up table or memory during manufacture of the reader 12 and/or may be dynamically updated based on different operating conditions. The comparator 72 may periodically or continuously retrieve the preset threshold from the look-up table or memory to compare with the current being measured by the current sensor 70.

In some embodiments, after the controller 68 activates the compensation circuit 220, the controller 68 may instruct the current sensor 70 to re-measure the current drawn by the resonance circuit 210. The re-measured current is compared by the comparator 72 to the preset threshold to determine whether a change in the resonance frequency of the resonance circuit 210 still falls outside the threshold. As an example, after activating the compensation circuit 220, the current measured by the current sensor 70 may now be within 5% of the normal operating current driven to the resonance circuit 210. The preset threshold may be set to a value that is 10% higher or lower than the normal operating current and, in such cases, the controller 68 may determine that the change in the resonance frequency of the resonance circuit 210 no longer falls outside the threshold (e.g., because the current measured by the current sensor 70 is not 10% more than or 10% less than the normal operating current of the resonance circuit 210).

In some embodiments, after the controller 68 activates the compensation circuit 220, the controller 68 may determine the current measured by the current sensor 70 may now be 12% greater than the normal operating current driven to the resonance circuit 210. Namely, the change in the resonance frequency of the resonance circuit 210 may still fall outside the threshold even though the compensation circuit 220 is activated. In such cases, the controller 68 may instruct the compensation circuit 220 to couple one or more additional capacitors in parallel with the resonance circuit 210 (e.g., to increase the total parallel capacitance coupled to the resonance circuit 210).

As an example, the compensation circuit 220 may include first and second compensation circuits. The first compensation circuit may include a first capacitor and the second compensation circuit may include a second capacitor. The first capacitor may be of the same size and value as the second capacitor. In such cases, the controller 68 determines that the change in the resonance frequency of the resonance circuit 210 falls outside a first threshold but is within a second threshold. For example, a first threshold may be set to a value of 10% greater than the normal operating current drawn by the resonance circuit 210 and the second threshold may be set to a value that is 15% greater than the normal operating current drawn by the resonance circuit 210. The controller 68 may determine that the current being drawn by the resonance circuit 210 is 12% greater than the normal operating current drawn by the resonance circuit 210. In such cases, the controller 68 determines that the change in the resonance frequency of the resonance circuit 210 (resulting from current being drawn by the resonance circuit 210 by an amount that is 12% greater than the normal operating current) falls outside the first threshold but is within the second threshold. In response, the controller 68 activates the first compensation circuit. By activating the first compensation circuit, the controller 68 couples the first capacitor in parallel to the resonance circuit 210.

In some cases, after activating the first compensation circuit or at some other time before the first compensation circuit is activated, the controller 68 measures the current driven to the resonance circuit 210. The controller 68 determines that the change in the resonance frequency falls outside the first threshold and the second threshold. For example, the controller 68 may determine that the current being drawn by the resonance circuit 210 is 17% greater than the normal operating current drawn by the resonance circuit 210. In such cases, the controller 68 determines that the change in the resonance frequency of the resonance circuit 210 (resulting from current being drawn by the resonance circuit 210 by an amount that is 17% greater than the normal operating current) falls outside the first threshold (e.g., set to a value of 10% greater than the normal operating current) and the second threshold (e.g., set to a value of 15% greater than the normal operating current). In response, the controller 68 activates the second compensation circuit. By activating the second compensation circuit, the controller 68 couples the first and second capacitors in parallel to the resonance circuit 210.

In some implementations, the first capacitor may be smaller than the second capacitor. In such cases, activation of the second compensation circuit couples a larger capacitor in parallel with the resonance circuit 210 and decouples the smaller capacitor of the first compensation circuit from the resonance circuit 210. Namely, only one of the first and second compensation circuits is coupled to the resonance circuit 210 at a time when different size capacitors are implemented by the respective compensation circuits.

In some embodiments, the first or second compensation circuits are coupled in parallel with the resonance circuit 210 by way of a switch, such as a transistor. For example, when the controller 68 activates (closes) a switch of the compensation circuit 220, one or more capacitors of the compensation circuit 220 may be coupled in parallel to the resonance circuit 210. When the switch is de-activated (opened), the one or more capacitors are decoupled from the resonance circuit 210.

In some embodiments, the value of the capacitor or capacitance in the compensation circuit 220 is determined when the reader 12 is manufactured. In one example, to do so, the reader 12 is mounted on a metal surface or material. A detuning effect on the resonance circuit 210 of the reader 12 is measured. As an example, the current sensor may output a first current value being drawn by the resonance circuit 210 when the reader 12 is not mounted on the metal surface or material. This first current value may represent the expected current drawn by the resonance circuit 210 under normal operating conditions. In some cases, the threshold may be computed as a function or factor of this expected current (e.g., the threshold may be set to a value of 10% greater than the first current value). In some cases, after the reader 12 is mounted on a metal surface or material, the current sensor may output a second current value being drawn by the resonance circuit 210. In such implementations, the threshold may be set to the value of the second current value or set to some value that is based on or is a function of the second current value but is higher or lower than the second current value. After the reader 12 is mounted on the metal surface, one or more capacitors may be coupled in parallel to the resonance circuit 210 until a capacitor value is determined that causes the current measured by the current sensor to be substantially close to the first current value. This capacitor value may be used to set the capacitor value of the compensation circuit 220. As such, when the reader 12 is operating in close proximity to a metal surface (e.g., as determined by the current measured by the current sensor 70 exceeding a threshold value), the controller 68 activates the compensation circuit 220 to couple the capacitor value in parallel to the resonance circuit 210 to offset a change in the resonance frequency of the resonance circuit 210.

In some embodiments, the capacitor value(s) can be determined mathematically (e.g., without actually mounting the reader 12 on a metal surface during manufacture). In some cases, the capacitor value(s) may be determined based on an expected metal material on which the reader 12 will be set during operation.

Figure 3:
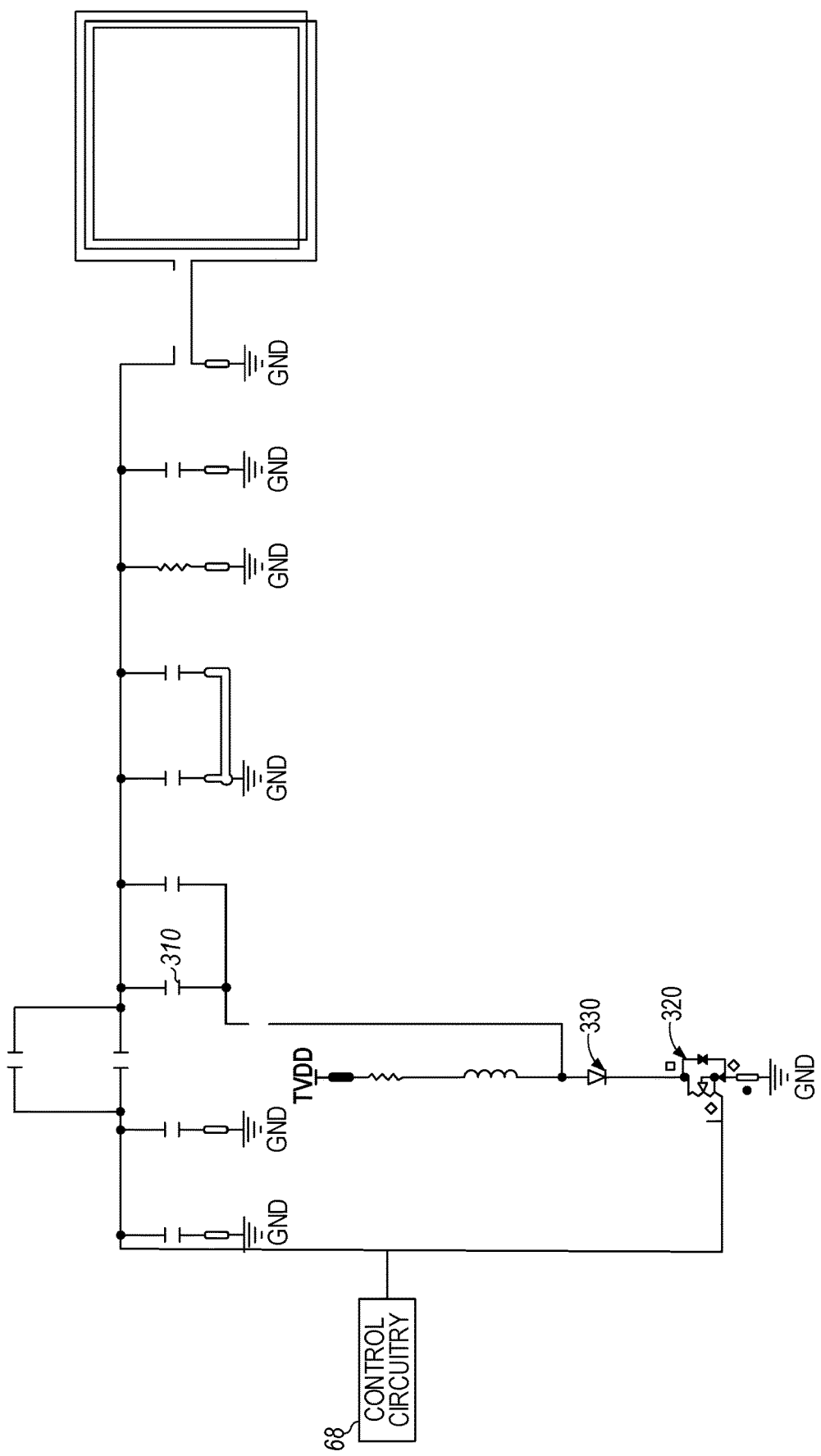
FIG. 3 is a block diagram illustrating a reader unit for use in an RFID system in accordance with various embodiments.

FIG. 3 is a block diagram illustrating a reader unit for use in an RFID system in accordance with various embodiments. As shown in FIG. 3, control circuitry 68 may be coupled to a resonance circuit and a compensation circuit. Control circuitry 68 may include and/or implement the functionality of controller 68. The control circuitry 68 measures current drawn by the resonance circuit. In response to determining that the current drawn by the resonance circuit exceeds a threshold, the controller 68 activates a switch 320. As a result, a compensation capacitor 310 becomes coupled in parallel with the resonance circuit. Namely, a first terminal of the compensation capacitor 310 is coupled to ground via a diode 330 and the switch 320. When the switch is de-activated, the compensation capacitor 310 is not coupled to ground and, as such, is decoupled from the resonance circuit. When the switch 320 is closed, the first terminal of the compensation capacitor 310 is coupled to ground via the diode 330 and the switch 320. A second terminal of the compensation capacitor 310 is coupled to first terminals of one or more capacitors of the resonance circuit. Second terminals of the one or more capacitors of the resonance circuit are coupled to ground. In this way, the compensation capacitor 310 can be coupled in parallel with the capacitors of the resonance circuit when the switch 320 is activated or closed.

Figure 4:
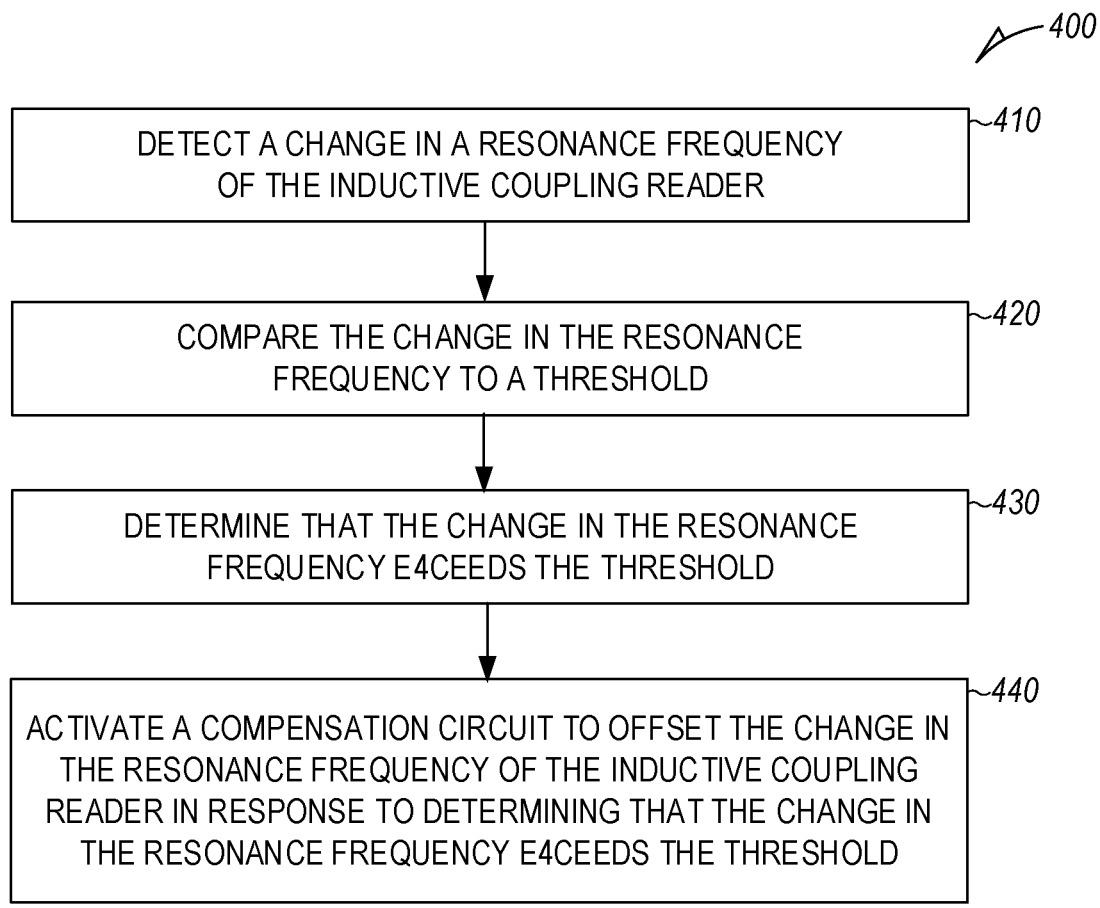
FIG. 4 is a flow diagram depicting an example process for operating an inductive coupling reader in accordance with various embodiments.

FIG. 4 is a flow diagram depicting an example process 400 for operating an inductive coupling reader in accordance with various embodiments.

At operation 410, the inductive coupling reader detects a change in a resonance frequency of the inductive coupling reader.

At operation 420, the inductive coupling reader compares the change in the resonance frequency to a threshold.

At operation 430, the inductive coupling reader determines that the change in the resonance frequency falls outside the threshold.

At operation 440, the inductive coupling reader activates a compensation circuit to offset the change in the resonance frequency of the inductive coupling reader in response to determining that the change in the resonance frequency falls outside the threshold.

Figure 5:
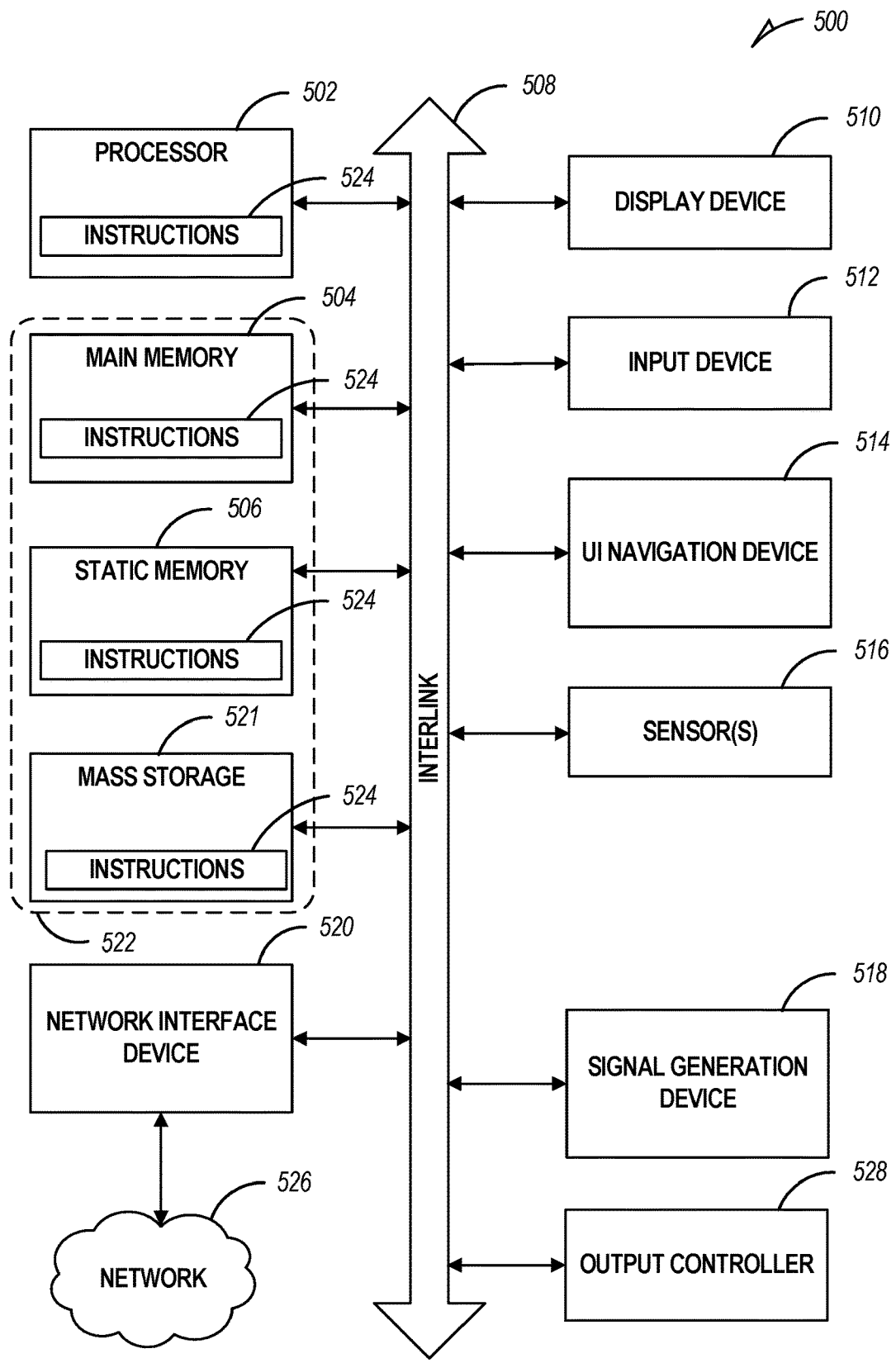
FIG. 5 is a block diagram illustrating an example of a machine upon which one or more embodiments may be implemented.

FIG. 5 is a block diagram of an example machine 500 upon which any one or more of the techniques (e.g., methodologies) discussed herein may be performed and/or that can be included in the reader discussed above. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a set-top box (STB), a personal digital assistant (PDA), a mobile telephone, a web appliance, an IoT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 500 may include a hardware processor 502 (e.g., a central processing unit (CPU), a graphics processing unit (GPU), a hardware processor core, or any combination thereof, such as a memory controller, etc.), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, alphanumeric input device 512, and UI navigation device 514 may be a touchscreen display. The machine 500 may additionally include a storage device 522 (e.g., drive unit); a signal generation device 518 (e.g., a speaker); a network interface device 520; one or more sensors 516, such as a Global Positioning System (GPS) sensor, wing sensors, mechanical device sensors, temperature sensors, ICP sensors, bridge sensors, audio sensors, industrial sensors, a compass, an accelerometer, or other sensors; and one or more system-in-package data acquisition devices 590. The system-in-package data acquisition device(s) 590 may implement some or all of the functionality of the offset calibration system 100. The machine 500 may include an output controller 528, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 522 may include a machine-readable medium on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 521 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 524.

The term "machine-readable medium" may include any transitory or non-transitory medium that is capable of storing, encoding, or carrying transitory or non-transitory instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data that are stored on the storage device 521 can be accessed by the main memory 504 for use by the hardware processor 502. The main memory 504 (e.g., DRAM) is typically fast, but volatile, and thus a different type of storage from the storage device 521 (e.g., an SSD), which is suitable for long-term storage, including while in an "off" condition. The instructions 524 or data in use by a user or the machine 500 are typically loaded in the main memory 504 for use by the hardware processor 502. When the main memory 504 is full, virtual space from the storage device 521 can be allocated to supplement the main memory 504; however, because the storage device 521 is typically slower than the main memory 504, and write speeds are typically at least twice as slow as read speeds, use of virtual memory can greatly reduce user experience due to storage device latency (in contrast to the main memory 504, e.g., DRAM). Further, use of the storage device 521 for virtual memory can greatly reduce the usable lifespan of the storage device 521.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 500, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, device, article, composition, formulation, or process that includes elements in addition to those listed after such a term in a claim are still deemed to fall within the scope of that claim. Moreover, in the following claims, the terms "first," "second," "third," etc., are used merely as labels, and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

What is claimed is:

1. A method for operating an inductive coupling reader, the method comprising:
   detecting a change in a resonance frequency of the inductive coupling reader;
   comparing the change in the resonance frequency to a threshold based on comparing an amount of current being driven to the inductive coupling reader to an expected amount of current;
   determining that the change in the resonance frequency falls outside the threshold based on determining that the amount of current being driven to the inductive coupling reader is greater or less than the expected amount by a given amount; and
   in response to determining that the change in the resonance frequency falls outside the threshold, activating a compensation circuit to offset the change in the resonance frequency of the inductive coupling reader.

2. The method of claim 1, wherein the change in the resonance frequency is caused by an external metal material in close proximity to the inductive coupling reader, and wherein a range of the inductive coupling reader is reduced as a result of the change in the resonance frequency.

3. The method of claim 1, wherein detecting the change in the resonance frequency comprises measuring the amount of current being driven to the inductive coupling reader using a current sensor.

4. The method of claim 3, wherein the inductive coupling reader comprises a Radio Frequency Identification (RFID) reader, and wherein detecting the change in the resonance frequency comprises measuring the amount of current being driven to the inductive coupling reader using a current sensor.

5. The method of claim 1, wherein the amount of current being driven to the inductive coupling reader comprises current being driven to an antenna of the inductive coupling reader, and wherein the given amount comprises ten percent of the expected amount of current.

6. The method of claim 1, further comprising retrieving the expected amount of current from a look-up table.

7. The method of claim 1, wherein the compensation circuit comprises one or more capacitors coupled in parallel to a resonance circuit of the inductive coupling reader.

8. The method of claim 1, further comprising verifying proper operation of the inductive coupling reader after activating the compensation circuit by comparing a current amount of current being driven to the inductive coupling reader to the expected amount of current.

9. The method of claim 1, wherein the compensation circuit comprises a first compensation circuit, and further comprising:
   activating the first compensation circuit in response to determining that the change in the resonance frequency falls outside the threshold and falls within a second threshold; and
   activating a second compensation circuit in response to determining that the change in the resonance frequency falls outside the threshold and the second threshold, wherein the second compensation circuit provides a greater offset to the resonance frequency than the first compensation circuit.

10. The method of claim 9, wherein activation of the first compensation circuit couples a first capacitor in parallel with a resonance circuit of the inductive coupling reader, and wherein activation of the second compensation circuit couples a second capacitor in parallel with the resonance circuit of the inductive coupling reader, the second capacitor being greater than the first capacitor.

11. The method of claim 10, wherein the second capacitor includes the first capacitor and at least one more capacitor.

12. The method of claim 1, further comprising computing the offset provided by the compensation circuit by:
   mounting the inductive coupling reader on a metal surface;
   measuring a detuning effect of the metal surface on the inductive coupling reader; and
   computing the offset to compensate for the measured detuning effect.

13. The method of claim 1, wherein the compensation circuit comprises:
   a switch; and
   one or more capacitors having a first terminal coupled to first terminals of capacitors of a resonance circuit of the inductive coupling reader and having a second terminal coupled to the switch.

14. The method of claim 13, wherein the one or more capacitors are coupled to the switch via a diode.

15. The method of claim 13, wherein activating the compensation circuit comprises closing the switch to couple the second terminal of the one or more capacitors to ground.

16. The method of claim 13, wherein the switch comprises a transistor.

17. A system comprising:
   an inductive coupling reader comprising one or more processors configured to perform operations comprising:
   detecting a change in a resonance frequency of the inductive coupling reader;
   comparing the change in the resonance frequency to a threshold based on comparing an amount of current being driven to the inductive coupling reader to an expected amount of current;
   determining that the change in the resonance frequency falls outside the threshold based on determining that the amount of current being driven to the inductive coupling reader is greater or less than the expected amount by a given amount; and
   in response to determining that the change in the resonance frequency falls outside the threshold, activating a compensation circuit to offset the change in the resonance frequency of the inductive coupling reader in response to detecting the change in the resonance frequency.

18. The system of claim 17, wherein the change in the resonance frequency is caused by an external metal material in close proximity to the inductive coupling reader, and wherein a range of the inductive coupling reader is reduced as a result of the change in the resonance frequency.

19. A non-transitory machine-readable medium comprising non-transitory machine-readable instructions that, when executed by one or more processors, configure the one or more processors to perform operations comprising:
- detecting a change in a resonance frequency of an inductive coupling reader;
- comparing the change in the resonance frequency to a threshold based on comparing an amount of current being driven to the inductive coupling reader to an expected amount of current;
- determining that the change in the resonance frequency falls outside the threshold based on determining that the amount of current being driven to the inductive coupling reader is greater or less than the expected amount by a given amount; and
- in response to determining that the change in the resonance frequency falls outside the threshold, activating a compensation circuit to offset the change in the resonance frequency of the inductive coupling reader.

20. The non-transitory machine-readable medium of claim 19, wherein the change in the resonance frequency is caused by an external metal material in close proximity to the inductive coupling reader, and wherein a range of the inductive coupling reader is reduced as a result of the change in the resonance frequency.

* * * * *